Sept. 19, 1933.  J. A. MARKSTRUM  1,927,409
MILLING CUTTER
Filed May 1, 1928
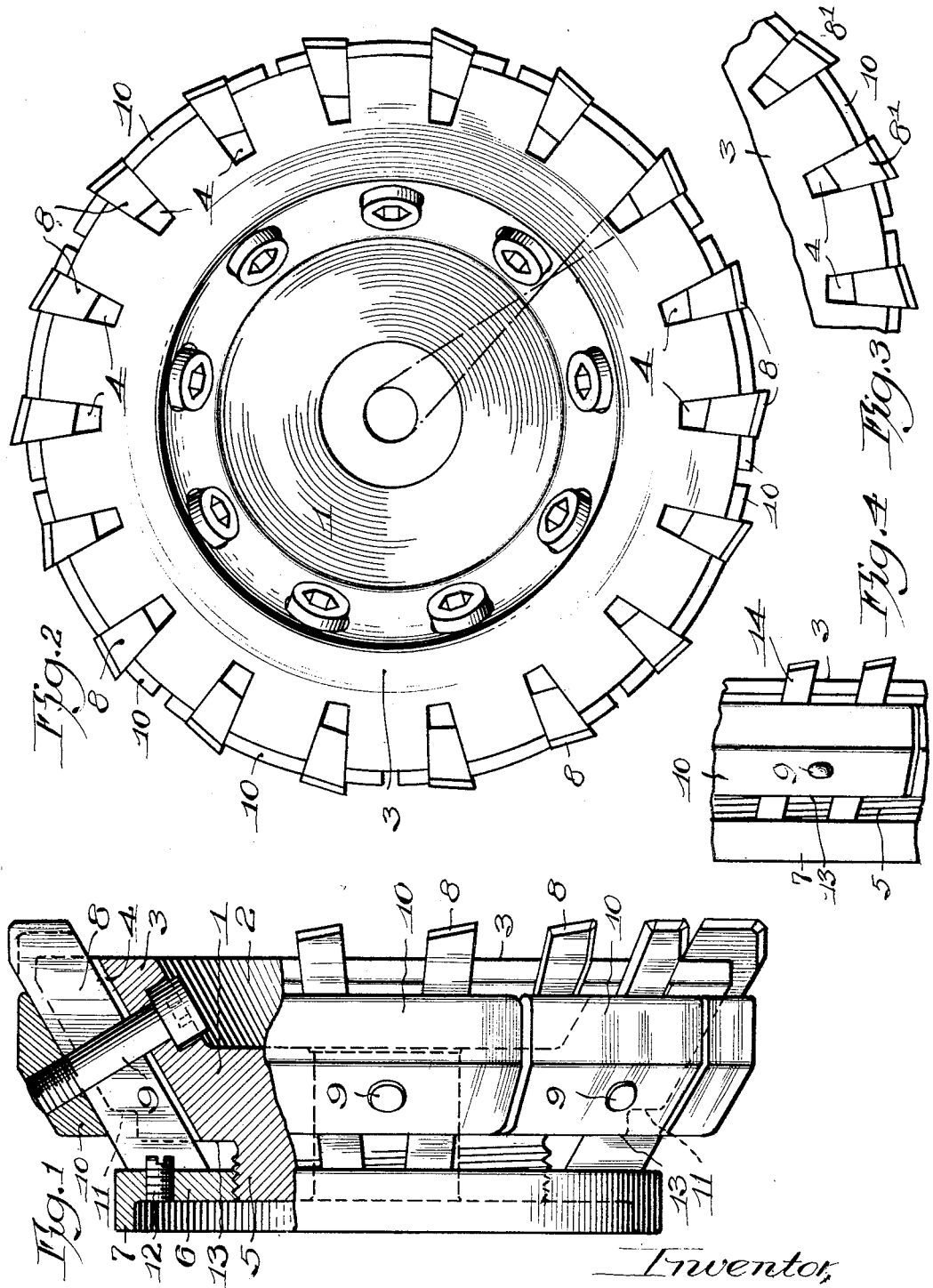

Patented Sept. 19, 1933

1,927,409

UNITED STATES PATENT OFFICE 1,927,409

MILLING CUTTER

John A. Markstrum, Detroit, Mich., assignor to Ex-Cell-O Aircraft & Tool Corporation, Detroit, Mich., a corporation of Michigan Application May 1, 1928. Serial No. 274,202

10 Claims. (Cl. 29—105)

My invention relates to improvements in milling cutters.

As used heretofore, the rotation of milling cutters has usually been in one direction only. In making a cut requiring rotation in the opposite direction, it has been necessary to use another milling cutter. In other words, it has been necessary to keep in stock both right hand cutters and left hand cutters.

One object of the present invention is to provide an improved milling cutter comprising a body having interchangeable teeth so designed that the cutter, as a whole, may rotate either way and cut equally well in either direction of rotation. Such construction makes it unnecessary to keep in stock more than one set of cutters with two sets of teeth or blades, the latter representing only a fraction of the total cost of the cutters. Also, the same teeth may be reground so as to be used either as right or left hand cutters.

Another object of the invention is to provide an improved tool of this character in which the teeth are removably clamped in wedge shaped grooves, spaced evenly around the periphery of the cutter.

A further object is to provide a device of this character in which each groove is symmetrical with respect to a radial plane whereby the cutter may be rotated with equal efficiency in either direction in making cuts, provided the teeth are ground to face in the right direction or provided two sets of teeth, right and left hand, are kept in stock.

An additional object is to provide a reversible cutter of such design that a strong, rugged tool is provided.

Other objects and advantages will be apparent from the description herein after given of a commercial embodiment of the invention.

In the drawing:

Fig. 1 is a side elevation of a milling cutter partly in section;

Fig. 2 is a front elevation thereof;

Fig. 3 is a partial elevation of a milling cutter having its teeth ground for reverse rotation; and Fig. 4 is a partial side elevation of a modification.

The body of the cutter 1, has a recess 2, in what may be called its front face, leaving a cone shaped flange 3, in the outer or peripheral surface of which a number of evenly spaced tapering or wedge-shaped longitudinal recesses or slots 4 are provided. The plane surfaces representing the faces of each recess intersect before reaching the center, as shown in Fig. 2. The angle between said plane surfaces preferably should be sufficiently small to permit retention of the blades in the slots solely by friction during the assembly operation, and also sufficiently small to prevent an unduly large component of the tangential, or circumferential, stresses incurred by each blade from pressing outwardly on the means for clamping the blades in the recesses. On the other hand, the angle preferably should be large enough to permit the blade to be mounted symmetrically relative to a radial plane, for reversal of direction of cut, and still provide a proper angle, or hook, for the cutting edge of the blade. It should also be large enough to prevent the blade from sinking so far into the recess, under heavy radial pressure, that it moves out of the pitch circle. This angle, as shown in Fig. 2, is approximately 15°, such size meeting the above-mentioned conditions to the greatest extent.

The rear of the body has a screw threaded extension 5, over which fits a screw threaded ring 6, having an annular flange 7, for a purpose hereinafter explained. The blades or teeth 8, are arranged at an angle with reference to the axis of rotation, as shown in Fig. 1, and have tapering sides corresponding to the tapering recesses 4, as shown in Fig. 2, the blades being truncated to clear the bottom of the slots. The blades are held in place by bolts 9 and nuts or clamps 10 exerting radial pressure on the blades. Said bolts extend outwardly through openings in the flange 3 and between the blades. The clamps as shown in Fig. 2 are long enough to extend over and rest on the outer surfaces of two adjacent blades as shown in Fig. 2. Thus, the clamping members 10 are equal in number to one-half the number of blades.

The blades may be ground to cut either right or left handed, Fig. 2, showing a right handed cutter.

The inner end of each blade is bevelled at its rear end so that it will lie in the same plane as the face of the ring or adjusting nut 6 constituting a backing, i. e. the plane is at right angles to the axis of rotation of the cutter, being vertical in the positon shown in Fig. 1. Thus, the thrust of the blades is received by the nut 6.

As the cutting faces of the blades wear away, the adjusting nut 6 may be rotated, after loosening the clamps, in order to advance all the cutters the necessary amount, to permit grinding or resharpening of the faces when they are in the same relative positions as they were initially. In making this adjustment, the nut 6 may be taken off and reversed, so that the annular flange 7 projects forwardly instead of rearwardly, and this flange may then be used to push the blades outwardly the maximum extent. Thus the blades may be fed forwardly from time to time, until they are consumed as far as is practical, thereby effecting a considerable economy. The rear face of the body 1 is cut away at 11 to provide an annular recess for clearance to accommodate the flange 7 in making the maximum forward adjustment. A stop screw 12, is inserted from the rear, and serves to lock the nut 6 against rotation. This stop screw strikes against either of two adjacent blades, when the latter are in the position shown in Fig. 1, which may be considered the initial position when the blades are new. As they are ground away and advanced until the stop screw extends forwardly of the plane of the rear face 13 of the cutter, said stop screw may be caused to project into any one of the wedge shaped recesses 4, to lock the nut 6 against rotation, as there is sufficient clearance between said nut and the rear ends of the blades when the nut is in reversed position.

A milling cutter constructed as described herein, will operate with equal effectiveness when rotating in either direction, assuming that the proper set of teeth are installed. Also, the circular pitch is always the same, regardless of slight variations in the depth to which the blades are inserted. Where an attempt has been made heretofore to provide a reversible milling cutter, reversible blades or teeth have been employed which fit into tapering radial recesses provided with a pair of circular key ways and a pin key. The difficulty with this milling cutter has been that in inserting the blades they are not always positioned at the same distance from the radius and the variation causes a variation of the circular pitch, resulting in a roughly machined surface on the part being milled.

Among the various other advantages of my improved design are the following: The wedge shaped recesses make it possible to use the maximum number of blades for the reason that even though the cross section of the metal between the blades is reduced to a certain minimum, said cross section is nearly uniform instead of decreasing rapidly toward the center of the cutter, and thus there is sufficient strength at the base of the slots. Furthermore, after the blades are installed, each blade forms a solid filler capable of receiving and transmitting the thrust of the adjacent blade when the latter happens to be making the cut. The blades are clamped on the two sides, i. e. in the most effective way, instead of on the top and bottom as in certain other designs. Said blades are of simple design readily machined form stellite or steel, and have no holes or grooves therein to weaken them. They are thick at the top where the cut is made, giving strength to the blade where it is needed, as well as providing a heavy section to absorb heat at the point where it is generated. The adjustable nut at the back of the cutter provides a positive stop, preventing the blades from slipping endwise, as well as permitting the adjustment previously described.

Although the form of the invention described herein is the preferred one, various changes may be made. For example, the blades 14 may be placed diagonally across the conical surface of the body as shown in Fig. 4 producing a cutter with both the hook and shear as required for cutting steel and similar metals, although with such a diagonal arrangement, the reversible feature is not available.

What I claim is:

1. A milling cutter comprising a body provided with blade slots, said body having an annular recess intersecting said slots, an adjusting member screw threaded to the rear of the body and being provided with a flange movable into said recess for adjusting the blades longitudinally of the slots, and a stop engageable in any one of said slots for locking said adjusting member in position.

2. A milling cutter comprising a body provided with blade slots, said body having an annular recess intersecting said slots, an adjusting member screw threaded to the rear of the body and being provided with a flange movable into said recess for adjusting the blades longitudinally of the slots and a stop engageable with any one of said blades for locking said adjusting member in position.

3. A milling cutter comprising a body provided with longitudinal peripheral slots having inwardly converging walls disposed at an angle of approximately 15° and arranged symetrically with respect to radial planes of said body, blades for said slots having plane side walls disposed at similar angles adapted for frictional engagement with said walls, said slots extending inwardly of said body beyond the inner edges of said blades to provide a clearance space whereby blades of less than normal thickness can be pressed into firm frictional engagement with said side walls of the slots, and a plurality of individually adjusted clamps one for each pair of blades on the outer edges of said blades for holding the same against radial displacement, the cutting edges of said blades being disposed beyond said body and clamps.

4. A milling cutter comprising a body having a conical periphery provided with open longitudinal slots having inclined side walls disposed at an angle of approximately 15°, blades for said slots having similarly disposed plane side walls adapted to seat frictionally within said slots, said slots extending radially inwardly sufficiently to provide clearance spaces at the inner edges of said blades whereby blades of different thicknesses can be pressed into frictional contact with said side walls of said slots, and clamps on the outer edges of said blades for preventing displacement of the same from frictional engagement with the walls of said slots, said blades being inclined at such angle with respect to the axis of said body that the outer cutting edges of said blades are disposed outwardly beyond said clamps and periphery of said body.

5. A milling cutter comprising a body having wedge-shaped longitudinal slots formed in the periphery thereof, blades having plane-walled truncated wedge-shaped portions to fit in said slots, means for exerting radial clamping pressure on said blades, said means being capable of exerting pressure on all blades irrespective of their dimensional variations, the truncated inner surfaces of said blades clearing the bottom of said slots to permit said plane walls to bear firmly against the wedge-shaped surfaces of said slots, the wedge angle of said slots and blades being of such size that movement of the blade is prevented by friction, said slots being symmetrical with reference to a radial line, whereby said milling cutter may be equipped with right or left-hand blades for operation in either direction.

6. A milling cutter comprising a body having wedge-shaped longitudinal recesses in the periphery thereof, blades having wedge-shaped portions to fit said recesses, means for drawing said blades into said recesses, and a reversible backing for one end of the blades to take the thrust, said backing being adjustable with reference to said body whereby said blades may be advanced to retain their cutting edges in substantially the same position as they wear away, said backing having an annular flange on one face thereof having an internal diameter larger than the adjacent portion of the body whereby, when said backing is reversed, said flange may overlie said portion and the range of adjustment of said blades by said backing is increased.

7. A milling cutter comprising a body having blade slots therein and having an annular recess intersecting said slots, and a blade adjusting member having an annular flange extending longitudinally from one face thereof movable into said recess for engaging the rear ends of the blades for adjusting the latter in said slots.

8. A milling cutter comprising a body provided with longitudinal peripheral slots having plane side walls arranged symmetrically with respect to a radial plane of the body and disposed in planes converging at an angle of approximately 15°, blades having similarly convergent plane side walls adapted to seat frictionally against the respective side walls of said slots whereby the same are held against longitudinal displacement in use, and a single clamping device for each pair of cutters for holding the same in frictional engagement with the walls of said slots.

9. A milling cutter comprising, in combination, a body having longitudinally extending blade slots therein, blades adjustably mounted in said slots, said body having a reduced portion adjacent its rear end and an extension beyond said reduced portion, and a ring adapted to receive the thrust of said blades, said ring being threaded on said extension and having an annular flange adapted to extend over said reduced portion to increase the range of adjustment of said blades.

10. A milling cutter comprising, in combination, a body having a plurality of longitudinal peripheral slots, a plurality of blades, one in each slot, said slots and blades having converging plane side surfaces symmetrical relative to a radius and forming an angle providing rigid frictional gripping of the blade, the respective side surfaces of each blade being at a proper angle to provide a small angle of undercut at the cutting edge of the blade for either direction of rotation, the blades clearing the bottoms of said slots to insure frictional gripping at the side surfaces, and means for clamping the blades in the slots comprising members equal in number to one-half the number of blades, each bearing on the outer surfaces of two of the blades, and individual means for tightening each member positioned between the blades clamped thereby.

JOHN A. MARKSTRUM.